United States Patent
Foore et al.

(10) Patent No.: US 7,539,136 B2
(45) Date of Patent: May 26, 2009

(54) RANDOM EARLY DETECTION OVER WIRELESS LINKS

(75) Inventors: Lawrence R. Foore, Palm Bay, FL (US); Kevin P. Johnson, Palm Bay, FL (US)

(73) Assignee: IPR Licensing, Inc., Wilmington, DE (US)

( * ) Notice: Subject to any disclaimer, the term of this patent is extended or adjusted under 35 U.S.C. 154(b) by 1137 days.

(21) Appl. No.: 10/302,797

(22) Filed: Nov. 21, 2002

(65) Prior Publication Data

US 2004/0100905 A1 May 27, 2004

(51) Int. Cl.
*H04L 12/26* (2006.01)
(52) U.S. Cl. .................. 370/230.1; 370/235
(58) Field of Classification Search ............ 370/229, 370/230.1, 232–236, 412, 428, 429, 465, 370/468
See application file for complete search history.

(56) References Cited

U.S. PATENT DOCUMENTS

| | | | | |
|---|---|---|---|---|
| 6,438,104 B1 * | 8/2002 | Fodor et al. | .................. | 370/230 |
| 6,501,732 B1 * | 12/2002 | Xu et al. | .................... | 370/235 |
| 6,625,118 B1 * | 9/2003 | Hadi Salim et al. | ......... | 370/229 |
| 6,829,649 B1 * | 12/2004 | Shorey et al. | ............... | 709/235 |
| 6,842,424 B1 * | 1/2005 | Key et al. | ................... | 370/236 |
| 7,006,440 B2 * | 2/2006 | Agrawal et al. | ............. | 370/235 |
| 7,023,800 B1 * | 4/2006 | McAuley et al. | ............ | 370/235 |
| 7,088,678 B1 * | 8/2006 | Freed et al. | ................. | 370/230 |
| 7,149,187 B1 * | 12/2006 | Jacobson et al. | ............ | 370/235 |
| 7,236,459 B1 * | 6/2007 | Okholm et al. | ............. | 370/231 |
| 7,254,609 B2 * | 8/2007 | Hart et al. | ................... | 709/203 |
| 7,304,948 B1 * | 12/2007 | Ong | ........................ | 370/230.1 |
| 7,333,436 B2 * | 2/2008 | Fukuda et al. | ........... | 370/235.1 |

OTHER PUBLICATIONS

Floyd et al., "Random Detection Gateways for Congestion Avoidance," IEEE/ACM Transactions on Networking, vol. 1, Issue 4, pp. 397 - 413 (Aug. 1993).

* cited by examiner

*Primary Examiner*—Wing F. Chan
*Assistant Examiner*—Mark A. Mais
(74) *Attorney, Agent, or Firm*—Volpe and Koenig PC

(57) ABSTRACT

Random early detection (RED) controlled loss (i.e., discarding data packets) is determined as a function of change in processing gain assigned by a resource management system in a data network having a communications link between first and second network nodes. Rather than triggering RED controlled loss as a function of buffer levels, triggering is determined as a function of change in processing gain caused by, for example, a change in code rate, modulation technique, error (e.g., bit error rate or frame error rate), signal-to-noise ratio (SNR) or carrier-to-interference (C/I) level, or a number of traffic code channels or TDMA slots assigned to the nodes. In a wireless data network, this technique may be deployed in a base station or access terminal. A tight coupling between the physical layer and link layer is provided using this technique.

16 Claims, 3 Drawing Sheets

RANDOM EARLY DETECTION OVER WIRELESS LINKS

BACKGROUND OF THE INVENTION

Random Early Detection (RED) is a buffering technique that allows a controlled level of loss to occur in packet buffers within routers when congestion is perceived. This controlled loss allows flow control processes within the transport control protocol (TCP) to scale back sending of data on a particular link or flow.

Controlled loss may also be performed on real time and near real time streams according to loss profiles that limit degradation to a level acceptable to end users. The controlled loss in an RED implementation is performed on a weighted basis, with flows occupying larger portions of the aggregate traffic flow having a higher probability of loss in the case of congestion.

In RED controlled loss techniques, the deciding factor or trigger for when discarding of packets should occur are the breaching of buffer levels, with levels configured or selected according to the data rate of individual links.

FIG. 1 is a block diagram of a data network 50 that uses the prior art breaching of buffer levels to trigger controlled loss in an RED implementation. The data network 50 includes a base transceiver station (BTS) 100 communicating with access terminals 110 over a wireless link 105 having forward link channels 175 and reverse link channels 180. The BTS 100 is connected to an antenna tower 120 for sending and receiving signals to and from the access terminals 110. The BTS 100 is connected to the Internet 130 via a wire, fiber optic, or wireless link 132. The access terminals 110 may be in wire, fiber optic, or wireless communication with another IP network 185 or other type of communication or data network.

The BTS 100 includes internal processing 140a to support data flow between the Internet 130 and access terminals 110. The access terminals 110 include similar internal processing 140a as the BTS 100. The internal processing 140a includes routing logic 145, priority based queues 150, random early detection (RED) logic 160a, and transceiver logic 165. The priority based queues 150 may be composed of several different queues or buffers 155a, 155b, 155c and 155d, such as a real time data queue, network control queue, TCP stream queue, or other data flow queue. Alternatively, the priority based queues 150 may be composed of four queues used to buffer TCP streams.

In the case of four TCP stream queues, a zero'th queue 155a may be very slow, a first queue 155b may be slow, a second queue 155c may be fast, and a third queue 155d may be very fast. When routing logic 145 determines that the third queue 155d is very fast, it sends as much TCP data through the third TCP queue as it can. However, because the third TCP queue receives a large volume of data, it may become congested. Using the breaching of buffer levels as the criterion for triggering controlled loss in an RED implementation, the RED logic 160a—monitoring the priority based queues 150 via status packets 170—sends back control data 172 to the third TCP queue 155d to cause it to begin discarding packets to implement a given loss profile, thereby causing the sender of data (e.g., Internet devices (not shown) or access terminals 110) to throttle back their sending of data.

SUMMARY OF THE INVENTION

Using the breaching of buffer levels to trigger Random Early Detection (RED) controlled loss can result in the communications link going into either 'congestion avoidance' or 'slow start' modes simultaneously. For wireless systems, these two phases of TCP are extremely inefficient because data is sent in small amounts instead of attempting to fully utilize the capacity of the assigned RF data link. This is expounded when all TCP sessions are synchronized in their congestion control states and all real time (or near real time) flows have been forced to queue large amounts of data, for example, because of changes in the RF environment. Thus, using buffer levels as a criterion for controlling data flow is suboptimal.

The difference between this triggering technique and typical RED implementations is that it uses a change in processing gain as assigned by a resource manager of the RF system to trigger RED controlled loss. This triggering technique may be applied to wireless data links and to future incarnations of base station subsystems or access units. Further, this triggering technique may be applied to 3G systems, 802.11 systems, 802.16 systems, fixed broadband systems, wired systems, and optical systems.

According to the principles of the present invention, a method and apparatus is provided for triggering random early detection controlled loss in a data network having a link between a first network node and a second network node. At least one of the network nodes may employ the method or apparatus to detect a change in processing gain and, in response to the detection, trigger the RED controlled loss to provide flow control for data over the link in the data network.

Detecting the change in processing gain may include monitoring: a code rate or modulation parameter, RF propagation losses, interference, error rates (e.g., bit error rate or a frame error rate), signal-to-noise ratio (SNR) or a carrier-to-interference (C/I) level, or a number of traffic code channels or time division multiple access (TDMA) slots assigned to the communication link between the two nodes.

The link to which the method or apparatus is applied may be wired, fiber optic, or wireless. In a wireless network, the method or apparatus may be deployed in a base station, access terminal, or other network node in which RED controlled loss is employed.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
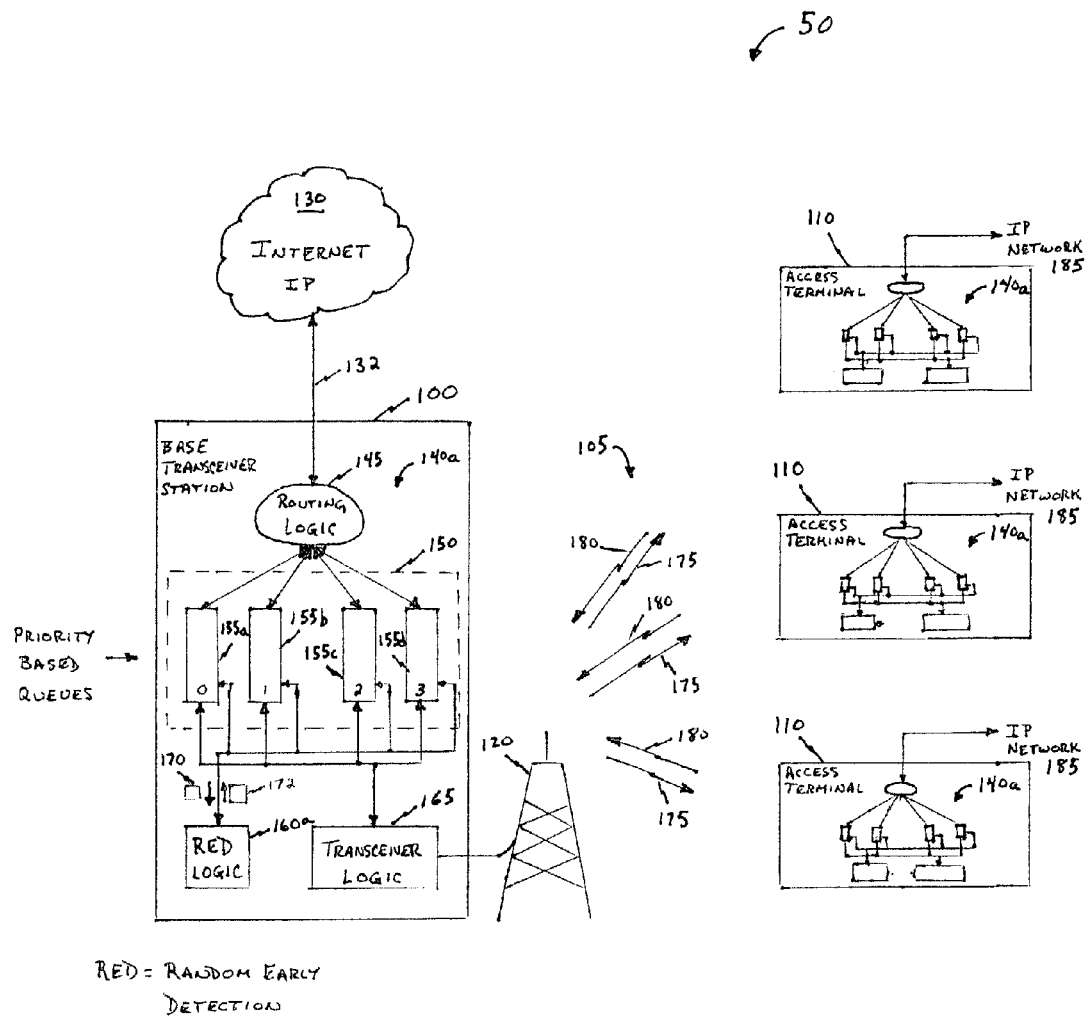
FIG. 1 is a block diagram of a wireless data network using a prior art technique for triggering Random Early Detection (RED) controlled loss.
Figure 2:
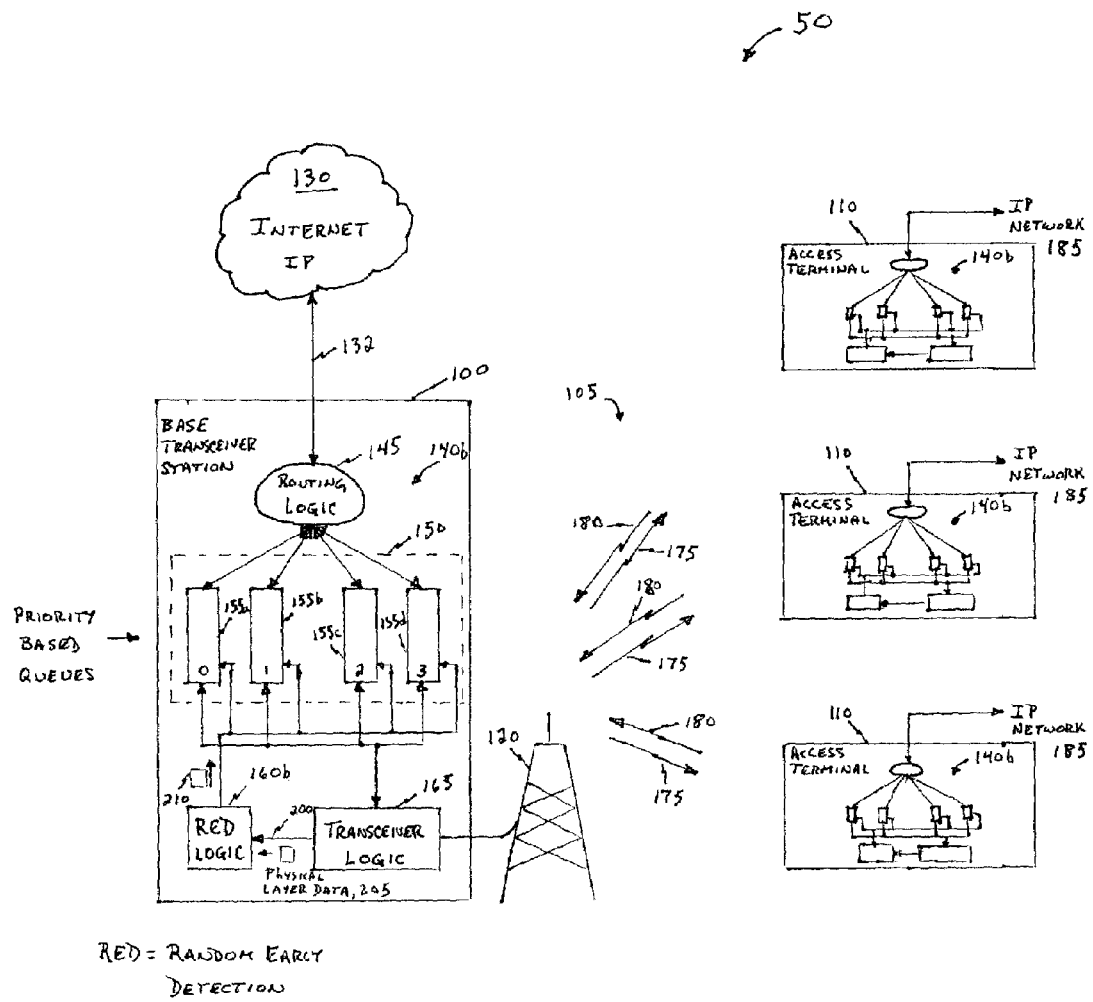
FIG. 2 is a block diagram of the wireless data network of FIG. 1 employing an embodiment of the present invention to trigger RED controlled loss.

FIG. 2 is a block diagram of the wireless network 50 of FIG. 1, described above, in which an embodiment of the present invention is deployed. In this embodiment, the transceiver logic 165 is coupled to Random Early Detection (RED) logic 160b via a bus 200. Physical layer data 205 flows from the transceiver logic 165 to the RED logic 160b. The RED logic 160b determines whether to trigger random early detection controlled loss in one of the priority based queues 150. If the RED logic 160b determines to trigger the RED controlled loss based on a change in processing gain (due to any number of factors), then it sends a message or command 210 to at least one of the queues 155a-155d.

In contrast to the prior art configuration in the which the RED logic 160a (FIG. 1) monitors buffer levels of the priority based queues 150, the RED logic 160b of the present invention monitors the transceiver logic 165 or other non-buffer level monitoring logic so as to provide triggering based on an instantaneous configuration change in processing gain. Basing the triggering on an instantaneous configuration change in processing gain (i) works faster than the prior art technique that looks at the buffer level of the queues 150 and (ii) prevents the effect of having all TCP links, for example, over an RF link go into either 'congestion avoidance' or 'slow start' modes simultaneously.

An example of a change in processing gain can be found as a change in processing gain between the base transceiver station 100 and the access terminals 110 that is measurable as a bit sequence change, where, for example, a 10101010 pattern is changed to a 1100110011001100 pattern. In this case, there is a doubling in the processing gain between the BTS 100 and the given access terminal 110.

Changes in the modulation technique, code rate, channel configuration, etc. that cause the triggering of RED controlled loss occur on the physical layer of the seven layers of the Open System Interconnection (OSI) model. The RED logic 160b provides feedback 210 to the queues 150 at the link layer of the OSI model. Thus, it can be said that, using the principles of the present invention, there is a tight coupling made between the physical layer and link layer to trigger RED controlled loss in the data network 50.

In the case of wireless links, various code rates or modulation techniques may be used to increase processing gain. One particular method for assigning channel codes, Forward Error Correction (FEC) code rate, and symbol modulation types is described in a co-pending U.S. patent application Ser. No. 09/773,253 filed Jan. 31, 2001 entitled "Maximizing Data Rate by Adjusting Code and Coding Rates in CDMA System", which is assigned to Tantivy Communications, Inc., the same assignee of the present application, the entire teachings of which are also hereby incorporated by reference. Using various code rates or modulation techniques to increase processing gain is found in the case of mobile wireless data links, where shadowing and/or multi-paths fades may cause significant fluctuations in path loss to and from the mobile unit. There are three ways to mitigate increased path loss or interference: increase transmit power, increase spread rate, and decrease forward error correction (FEC) code rate.

In the latter two options, the cost of increasing the processing gain is a reduction in data throughput. Also, the level of system loading affects the data rates delivered to individual access units due to multiplexing and/or random access techniques. Systems that intend to carry wideband data (i.e., 3G systems, 802.11 systems, 802.16 systems, fixed broadband systems, etc.) generally require power control methods as well as various levels of coding gains.

Switching from a high FEC code rate to a low FEC code rate increases processing gain, but decreases delivered data rates. Likewise, modulation techniques such as 32 Quadrature Amplitude Modulation (QAM) offer potentially high data rates, but less processing gain. Regardless of processing gain, all wireless data is subject to loss because of fluctuations in the RF environment.

Resource management processes within the management unit (i.e., the base station) of the RF system may decide to switch a mobile unit's code rate or modulation technique to increase processing gain in times of unfavorable RF conditions. This switch decreases the overall data rates delivered to the receiver.

Since the detection of errors and the fluctuation in power levels on the physical link need to be managed intricately over wireless links, knowledge of data rate reduction—due to increase in RF propagation losses or increased interference on the link—lies very close to the logic associated with the data transmit buffers. The increase in losses or interference causes an increase in processing gain, which can be used as a trigger for the RED controlled loss, which gradually reduces the offered load to the link.

Similar to RED methods, each packet of individual TCP connections or real time (or near real time) traffic streams may be identified and tagged with a probability of loss. Once in the transmit queue, each packet is subject to being discarded (with the associated probability applied) in the case of decreased data rates. Probabilities may be weighted according to how much bandwidth the flow has consumed.

Figure 3:
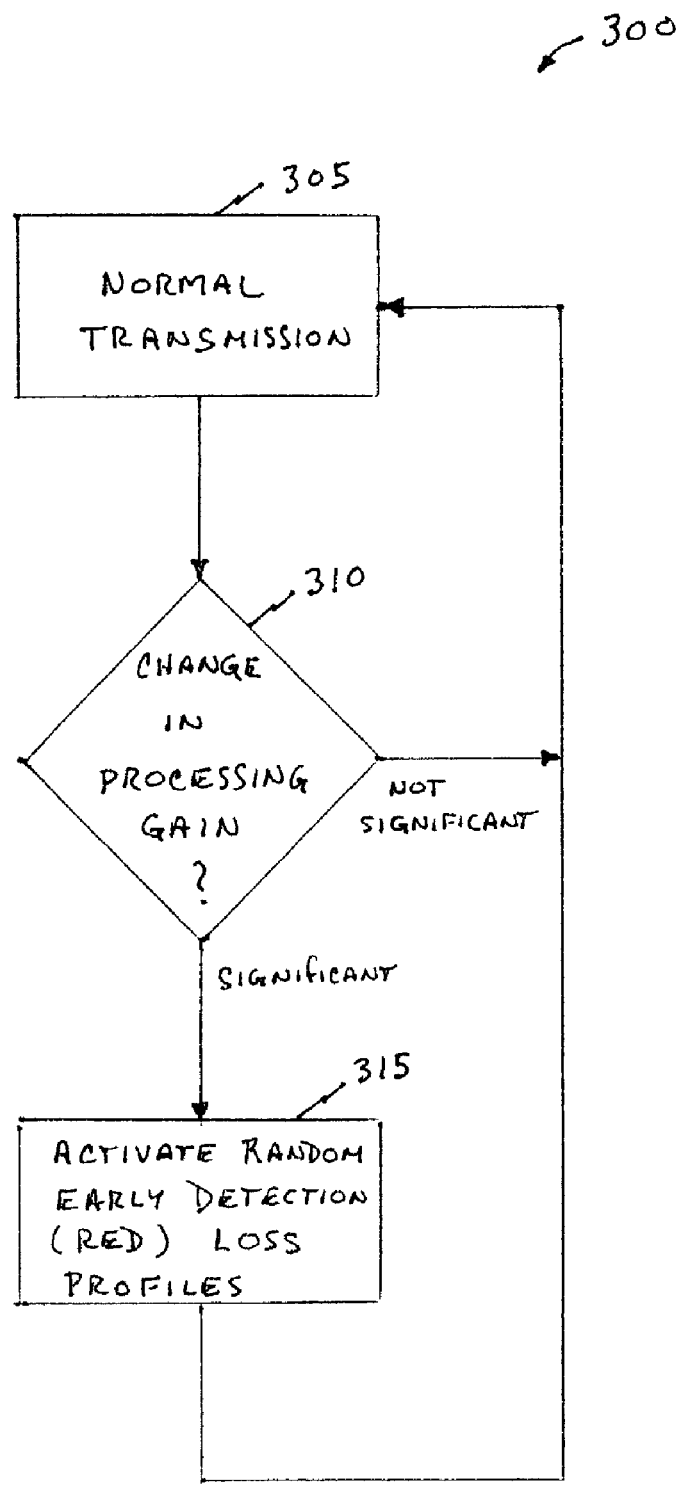
FIG. 3 is a flow diagram of the triggering technique of FIG. 2.

FIG. 3 is a flow diagram of a process used by the RED logic 160b. The process 300 monitors the transceiver logic 165, which assists in normal transmission of data in Step 305 between the base transceiver station 100 and the access terminals 110. In Step 310, the process 300 determines whether there is a significant change in processing gain. If there has been a significant change, then the process 300 continues to Step 315, in which the RED logic 160b triggers random early detection (RED) controlled loss profiles in the priority base queues 150. If there is not a significant change in the processing gain, as determined in Step 310, then the process 300 continues with its normal transmission processes in Step 305.

As an example of a change in processing gain detected by Step 310, the modulation rate by the transceiver logic 165 may be changed to 1/3 from 4/5 ths. In this case, the loss profile is triggered in Step 315. If, for example, the modulation rate changes to 1/3 from 4/5ths then back to 4/5ths in less than a predetermined time span, then there may be no activation of random early detection loss profiles in Step 315. That is, there may be hysteresis built into the process 300.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for triggering random early detection controlled loss between first and second network nodes, the method comprising:

detecting an instantaneous configuration change in processing gain, including monitoring a code rate or modulation parameter on a link between the first and second network nodes; and based on the detection, triggering random early detection controlled loss to provide flow control for data over the link in the data network.

2. The method according to claim 1 wherein detecting a change in processing gain includes monitoring RF propagation losses, interference, or error rate on the link.

3. The method according to claim 2 wherein the errors include a bit error rate or frame error rate.

4. The method according to claim 1 wherein detecting a change in processing gain includes monitoring a signal-to-noise ration (SNR) or carrier-to-interference (C/I) level.

5. The method according to claim 1 wherein detecting a change in processing gain includes monitoring a number of traffic code channels or time division multiple access (TDMA) slots assigned to at least one of the network nodes.

6. The method according to claim 1 wherein the link is wireless.

7. The method according to claim 1 deployed in a base station in the data network.

8. The method according to claim 1 deployed in an access terminal in the data network.

9. An apparatus for triggering random early detection controlled loss between first and second network nodes, the apparatus comprising:

a detector to detect an instantaneous configuration change in processing gain including a change in code rate or modulation parameter on a link between the first and second network nodes; and a logic unit coupled to the detector to trigger random early detection controlled loss based on an output from the detector to provide flow control for data over the link in the data network.

10. The apparatus according to claim 9 wherein the detector detects a change in RF propagation losses, interference, or error rate on the link 11. The apparatus according to claim 10 wherein the errors include a bit error rate or frame error rate.

12. The apparatus according to claim 9 wherein the detector detects a change in a signal-to-noise ratio (SNR) or carrier-to-interference (C/I) level.

13. The apparatus according to claim 9 wherein the detector detects a change of a number of traffic code channels or time division multiple access (TDMA) slots assigned to at least one of the network nodes.

14. The apparatus according to claim 9 wherein the link is wireless.

15. The apparatus according to claim 9 deployed in a base station in the data network.

16. The apparatus according to claim 9 deployed in an access terminal in the data network.

* * * * *